United States Patent [19]

Gandhi et al.

[11] 4,192,779

[45] Mar. 11, 1980

[54] CATALYST SYSTEM AND METHOD FOR INCREASING THE SELECTIVITY OF A CATALYST

[75] Inventors: Haren S. Gandhi, Farmington Hills, Mich.; William L. Watkins, Toledo, Ohio; Henryk K. Stepien, Dearborn Heights, Mich.

[73] Assignee: Ford Motor Company, Dearborn, Mich.

[21] Appl. No.: 924,415

[22] Filed: Jul. 13, 1978

Related U.S. Application Data

[63] Continuation-in-part of Ser. No. 843,396, Oct. 19, 1977, abandoned.

[51] Int. Cl.$^2$ .................... B01J 23/42; B01J 23/44; B01J 23/64
[52] U.S. Cl. .................... 252/470; 252/465; 423/213.5
[58] Field of Search .................... 252/470, 465; 423/213.5, 213.2

[56] References Cited

U.S. PATENT DOCUMENTS

| 3,619,127 | 11/1971 | Hass et al. .................... 423/213.5 |
| 3,840,471 | 10/1974 | Acres .................... 252/462 X |
| 4,061,713 | 12/1977 | Weidenbach et al. .................... 423/213.5 |

*Primary Examiner*—W. J. Shine
*Attorney, Agent, or Firm*—William E. Johnson; Keith L. Zerschling

[57] ABSTRACT

A method is taught for increasing the selectivity of a catalyst in that the catalyst reduces the amount of ammonia produced when exhaust gases are catalytically treated to eliminate oxides of nitrogen therefrom. The method involves including molybdenum on the support media for the catalyst, in addition to the principal catalyst system present to effect the reduction of oxides of nitrogen.

7 Claims, 6 Drawing Figures

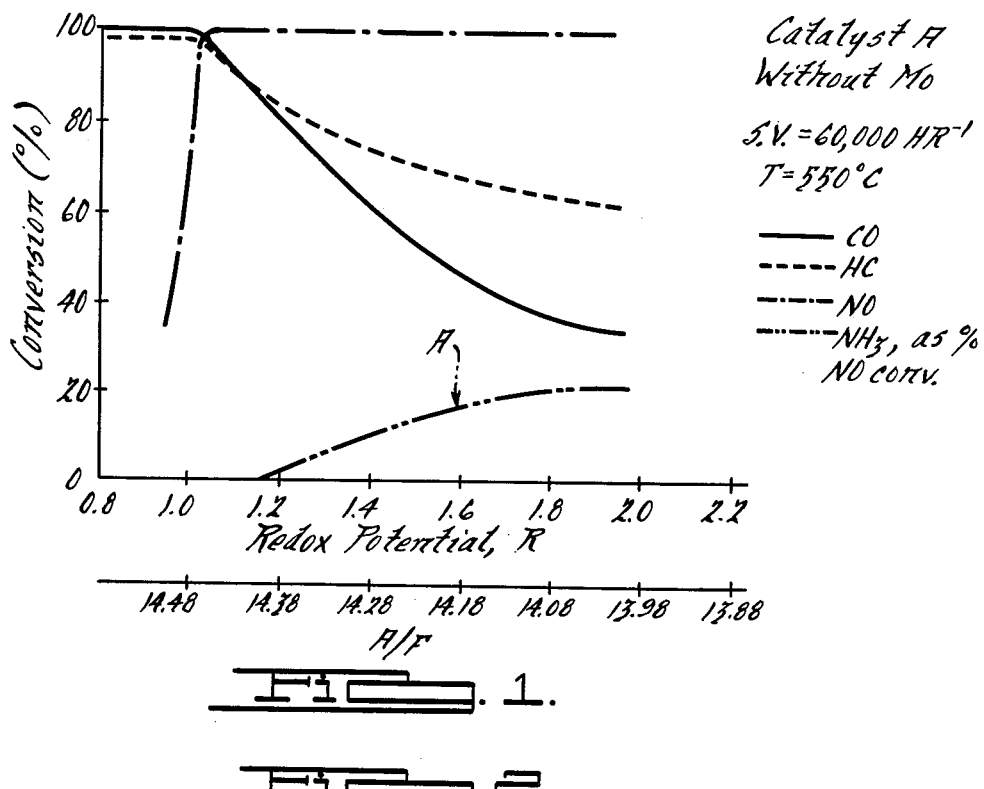
FIG. 1.
FIG. 2.
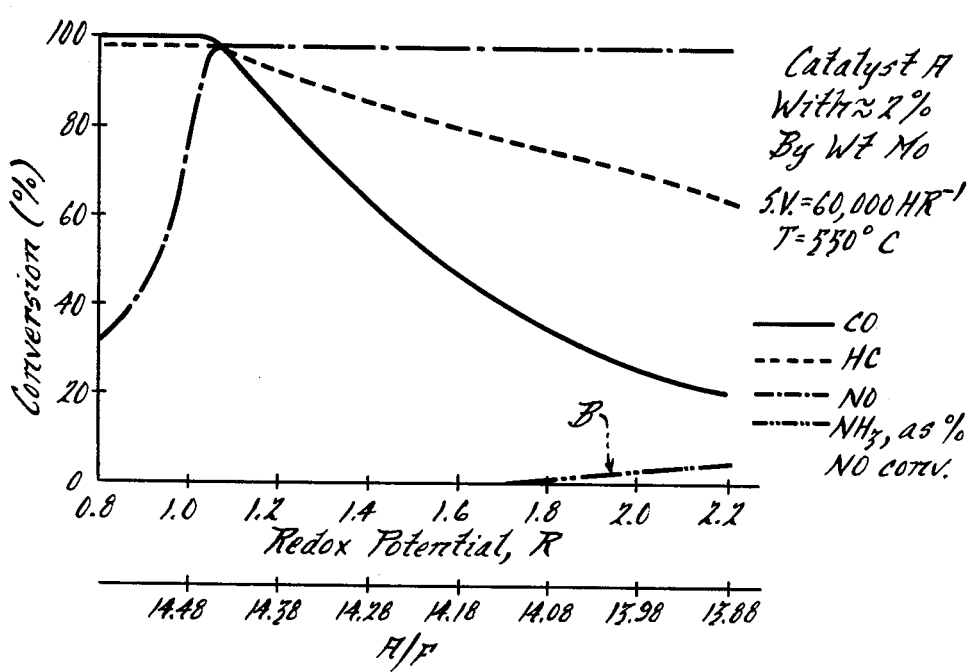

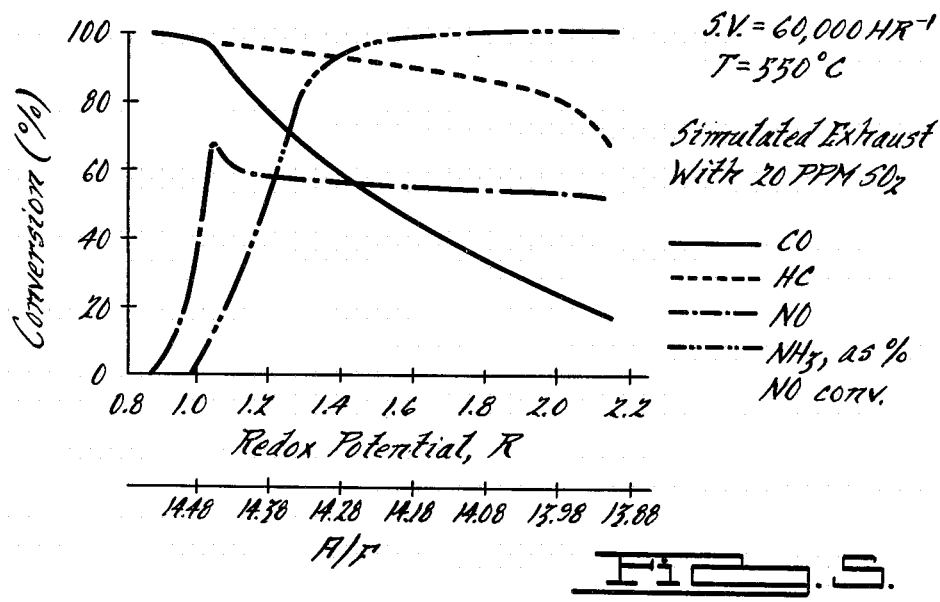
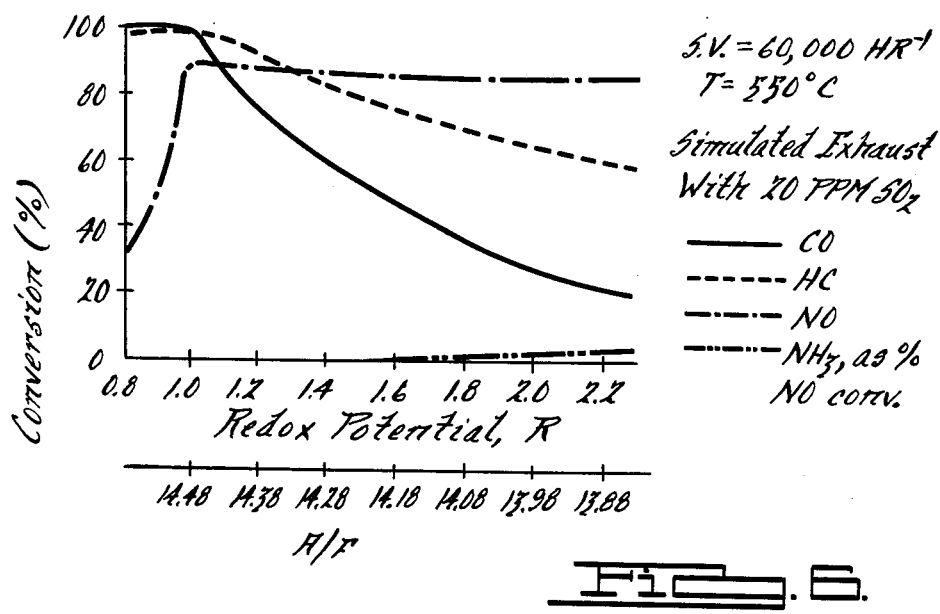

CATALYST SYSTEM AND METHOD FOR INCREASING THE SELECTIVITY OF A CATALYST

PRIOR INFORMATION

This application is a continuation-in-part of our prior application, Ser. No. 843,396, filed Oct. 19, 1977, now abandoned for A METHOD OF TREATING EXHAUST GASES WITH A MOLYBDENUM CONTAINING CATALYST.

BACKGROUND OF THE INVENTION

Catalytic converters are being used to treat exhaust gases developed from the burning of a hydrocarbon fuel in an automotive internal combustion engine. One of the functions of these catalytic converters is to reduce the oxides of nitrogen produced in the combustion process. In this reduction reaction, it is possible to form ammonia as an end product. This ammonia, in some cases, is re-oxidized on an oxidation catalyst to form, once again, the oxides of nitrogen which had been sought to be eliminated.

Those skilled in the art have attempted to remove oxides of nitrogen from the gas stream evolved from an internal combustion engine in two general manners. In a first manner, a nitrogen oxide reduction catalyst is used by itself and the gases passing therethrough are generally overall reducing in composition. By reducing, it is meant that the gases have less oxygen present than fuel to be burned. This type of catalyst system is designed solely to eliminate oxides of nitrogen.

A second approach to elimination of oxides of nitrogen has been the so-called three-way catalytic converter. This type of converter operates at or near a stoichiometric air/fuel ratio in which the air present is sufficient to burn the fuel present. In this type of a converter, unburned hydrocarbons and carbon monoxide are oxidized and oxides of nitrogen are reduced.

Those skilled in the art are aware that it is possible to get ammonia produced as one of the final reaction products when either a reduction catalyst or a three-way catalyst is used to treat exhaust gases. It is a principal object of this invention to provide a method and a catalyst for treating exhaust gases from an internal combustion engine which suppresses the production of ammonia.

U.S. Pat. No. 4,061,713 is directed to a catalyst in which a catalyst system comprises molybdenum, rhodium and, optionally, platinum supported on a suitable support media. In accordance with the teachings of this patent, the molybdenum, rhodium and optional platinum content of the catalyst system may be from about 0.01 to 0.1% by weight of each metal and the catalyst system preferably contains, by weight based on the weight of the catalyst support media, about 0.02 to 0.08% molybdenum, about 0.02 to 0.04% rhodium, and about 0.04 to 0.08% platinum, the atomic ratio of molybdenum to rhodium being preferably from about 1:1 to 4:1.

SUMMARY OF THE INVENTION

This invention relates to a method of increasing the selectivity of a catalyst, and also to a catalyst of increased selectivity.

In accordance with the teachings of the method of this invention, the selectivity of a catalyst is increased as follows. The catalyst system is based upon (a) platinum, (b) palladium, (c) combinations of platinum and palladium, or (d) combinations of (a), (b) or (c) with other metal catalysts. This catalyst system is deposited on a suitable support media as discreet particles in a finely divided state. The method of increasing the selectivity of this catalyst is one which comprises the step of providing on the support media molybdenum in a finely divided state. The molybdenum is present in an amount from at least ½% to about 20% by weight of the support media, but, in any event, the molybdenum is present on the support media by weight in an amount at least from about 7 times to preferably about 10 times the weight of the platinum or palladium present on the support media, i.e., if the platinum or palladium is present in a concentration of 0.1 weight percent, then 0.7 weight percent molybdenum is desired with 1.0 weight percent preferred.

In accordance with the further teachings of this invention, with respect to the inventive catalyst of increased selectivity, the catalyst is as follows. The catalyst includes a support media for finely divided materials. A finely divided metal catalyst system is placed on the support media in an amount from about 0.1% by weight to about 2.0% by weight of the weight of the support media. Finely divided molybdenum is provided on the support media in an amount from at least ½% by weight of the weight of the support media, but, in no event, less than about 7 times, and preferably about 10 times, the weight of the finely divided platinum and/or palladium in the metal catalyst system on the support media.

We have found that by placing molybdenum on the support media in an amount from at least 7 times to preferably at least about 10 times the weight of the platinum and/or palladium in the finely divided metal catalyst system on the support media, the overall catalyst does a vastly superior job of transforming oxides of nitrogen into components, other than ammonia, than either the supported catalyst system by itself can do or the supported molybdenum by itself can do. Normally, platinum and/or palladium containing catalysts, under reducing conditions, convert large fractions of oxides of nitrogen to ammonia. Molybdenum, by itself, does not convert oxides of nitrogen. However, when platinum and/or palladium and molybdenum are combined on a single support media, and when the molybdenum exceeds the weight of the platinum and/or palladium of the finely divided metal catalyst system in a weight ratio of at least 7:1, and preferably 10:1, the overall catalyst is very effective in transforming oxides of nitrogen to other components with a very low production of ammonia. In these cases, ammonia is only produced under severe reducing conditions and when it is produced, it is produced at an extremely low level, substantially less than the amount of ammonia produced when a platinum and/or palladium catalyst system is used by itself on a support media.

When less than about a ratio of 7:1, and preferably 10:1, molybdenum to the platinum and/or palladium of the metal catalyst system is used, the ammonia production rapidly increases. For example, even if the two materials are present on a support media in a ratio of 2:1 to 4:1, the ammonia produced by the catalyst returns to the amount produced as if no molybdenum was present at all. Thus, we have discovered that with large concentrations of molybdenum present on a support media for a platinum and/or palladium containing catalyst system, such a catalyst will produce substantially reduced amounts of ammonia under severe reducing conditions than if no molybdenum or lower amounts of molybdenum was present on the support media.

This characteristic of high molybdenum usage may also be advantageously used in catalyst systems in which rhodium is also present with platinum and/or palladium. Rhodium is normally obtained in a mine ratio of one unit or rhodium for every 19 units of platinum obtained. However, normally rhodium containing catalyst systems are enriched and a higher ratio of rhodium to platinum is used because rhodium is more selective in treating oxides of nitrogen. Enriched rhodium catalysts produce less ammonia than un-enriched catalysts based on rhodium and platinum. However, when one uses rhodium and platinum in a ratio different than that obtained from the mine, one is not getting the best use of the mined materials. By using our invention, namely, the placement of at least 7 times, and preferably 10 times, the weight or more of platinum and/or palladium contained on a support media of molybdenum, the platinum and/or palladium becomes much more selective in the treatment of oxides of nitrogen and one does not have to rely upon the greater selectivity of the rhodium in order to accomplish the selective elimination of oxides of nitrogen.

Thus, one can make a platinum-rhodium catalyst system at mine ratio of the ingredients and still achieve a very selective catalyst if molybdenum, in the specified amounts, is used on the support media. Having molybdenum present in such an increased amount, we believe, insures that molybdenum is available near or at all of the sites for catalytic activity of the platinum and/or palladium, and somehow affects the catalytic action of these catalyst elements in a manner by which the catalyst elements will produce nitrogen, rather than ammonia.

It is believed that the molybdenum, in close proximity to the platinum or palladium, keeps hydrogen (necessary to the production of ammonia) away from the platinum or palladium surface. In this way, the oxide of nitrogen reduction is achieved by carbon monoxide, resulting in the production of nitrogen gas. We also would like to note that under reducing conditions, platinum is poisoned by sulfur dioxide present in exhaust gases. Molybdenum also improves the sulfur resistance of platinum, presumably by keeping sulfur away from the platinum surface.

The dramatic decrease in the amount of ammonia produced between a platinum and/or palladium containing catalyst system and that same catalyst system having the required amount of molybdenum thereon, will be demonstrated in the balance of this specification.

BRIEF DESCRIPTION OF THE DRAWINGS

FIG. 1 is a graph which shows the effect of treatment of a simulated exhaust containing 20 parts per million sulfur dioxide by a three-way catalyst system containing no molybdenum.

FIG. 2 is a graph similar to FIG. 1, but shows the results obtained using the same catalyst which has 2% by weight of the weight of the support media molybdenum added thereto. The molybdenum added to the support media is about 10 times the weight of the platinum present on the support media.

FIG. 5 is a graph which shows the effects of treatment of the same simulated exhaust over 0.176% by weight of the support media platinum with no molybdenum present.

FIG. 6 is a graph which shows the effects of treatment of the same simulated exhaust over 0.25% by weight of the support media platinum with 2.0% by weight of the support media molybdenum.

DESCRIPTION OF THE PREFERRED EMBODIMENT

In order to illustrate the method of our invention, several different catalyst samples and the way they treat simulated exhaust gases will be described. The first catalyst to be described will be described in conjunction with the data plotted in FIGS. 1 and 2. In this case, we made a three-way catalyst which contained platinum and rhodium as the catalyst system. The combined platinum and rhodium was placed on a ceramic honeycomb substrate of known construction at a deposition rate of about 40 grams per cubic foot, which gives a density of the platinum as 0.2% by weight of the substrate. The platinum to rhodium ratio was 11 to 1. As is known in the art, the catalyst system is placed on the support media as discreet particles in a finely divided state.

The catalyst so prepared was tested for activity at 550° C. with a simulated exhaust gas at a space velocity of 60,000 reciprocal hours. The catalyst, in addition to platinum and rhodium, contained an alumina stabilizer and an oxygen storage component which are known to those skilled in the art. The efforts of our test are shown in FIG. 1.

The point to be noted from FIG. 1 is the percent of oxides of nitrogen which are converted to ammonia, as indicated by the line identified with the letter "A." The ammonia production started at a radox potential of 1.18 and climbed to greater than 20% of the conversion products of oxides of nitrogen when a redox potential of 1.8% was reached.

Exactly the same catalyst was used in a second test. In this case, however, 2% by weight of the weight of the substrate molybdenum was added to the catalyst substrate. This was incorporated with the substrate by treating the substrate with ammonium molybdate solution. After treatment with the solution, the catalyst substrate was dried at 100° C. and then calcined at 300° C. for four hours, as is common in preparing catalysts.

The testing procedure which was carried out on the first described catalyst, was carried out on molybdenum containing catalyst. The results are shown in FIG. 2, in which line "B" indicates the ammonia production as a percentage of the conversion product of nitrogen oxides. It should be easy to note that there was a drastic improvement. In this case, ammonia production did not start until a redox potential of 1.75 had been reached and was only between 1 and 2% at a redox potential of 1.8, whereas without molybdenum it was in excess of 20% at this point.

Another benefit was achieved in a lean region, that is where there is more air than fuel to be burned. In this region, there is a better oxides of nitrogen conversion. For example, at a redox potential of 0.95, the oxides of nitrogen conversion for molybdenum containing catalysts is 57%, compared to 34% for the non-molybdenum catalyst illustrated in FIG. 1.

Figure 3:
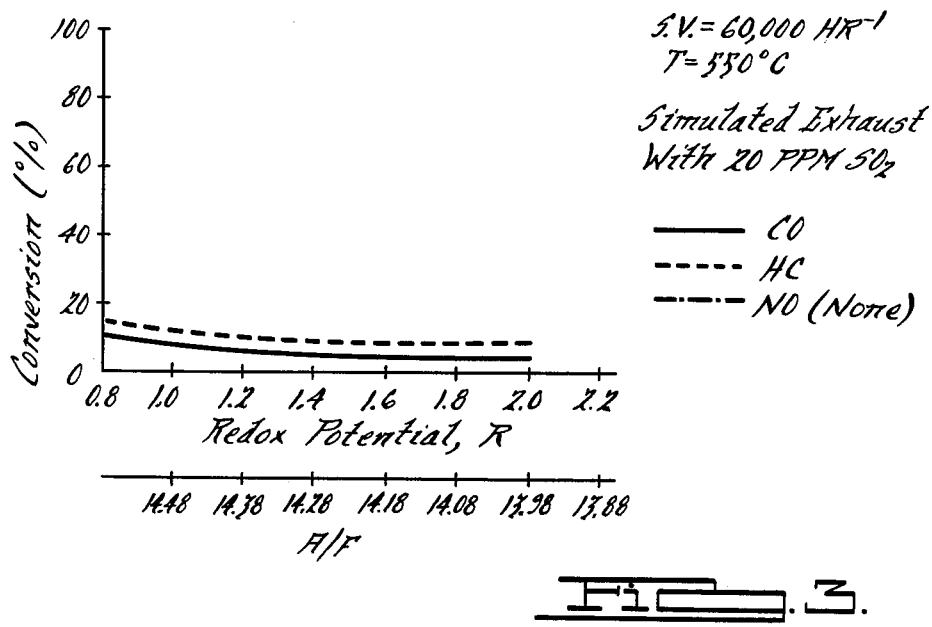
FIG. 3 is a graph which shows the results obtained by using a 2% by weight of the support media molybdenum to treat the same simulated exhaust as used in the testing of the catalyst shown in FIGS. 1 and 2.

Attention is drawn to FIG. 3 which is a test under the same conditions as the tests conducted in FIGS. 1 and 2 on a support media which contains 2% molybdenum by weight of the support media. In this situation, it is noted that the system does not, in fact, reduce oxides of nitrogen at all. Thus, the unexpected, drastic reduction of the amount of ammonia produced when molybdenum is combined with a platinum and/or palladium based catalyst, is demonstrated. Molybdenum, by itself, is not effective to reduce oxides of nitrogen, as is shown in the graph of FIG. 3. Therefore, no one would be led to believe that this material, when used in conjunction with a platinum and/or palladium based catalyst, would assist the platinum and/or palladium based catalyst in reducing oxides of nitrogen without the production of substantial quantities of ammonia.

In our experimentation, we have found that the amount of molybdenum present, in conjunction with a platinum and/or palladium based catalyst in order to obtain this improvement, is a critical feature. For example, if the molybdenum is present in a ratio of only 1 or 2 times the weight of platinum and/or palladium present, there is no reduction in the amount of ammonia produced as a percentage of the oxides of nitrogen converted. At a ratio of about 5 to 1 molybdenum present by weight, as compared to the platinum and/or palladium based catalyst present, the reduction of ammonia by such a system starts to be slightly noticeable. However, there is not a significant reduction in the production of ammonia as a percent of the conversion products of oxides of nitrogen until the ratio of molybdenum and/or palladium present reaches a level of at least 7 to 1, and preferably, 10 to 1. In the 10 to 1 preferred ratio, a significant reduction in the amount of ammonia produced as a percentage of oxides of nitrogen converted is achieved. Since molybdenum is relatively inexpensive, when compared to the precious metals, we prefer to use the ratio of at least 10 to 1 by weight molybdenum to platinum and/or palladium. In any event, the ratio should be at least 7 to 1. When a ratio of 10 to 1 is exceeded by any substantial amount, it appears that one is simply wasting molybdenum. The preferred range is right about 10 to 1.

Figure 4:
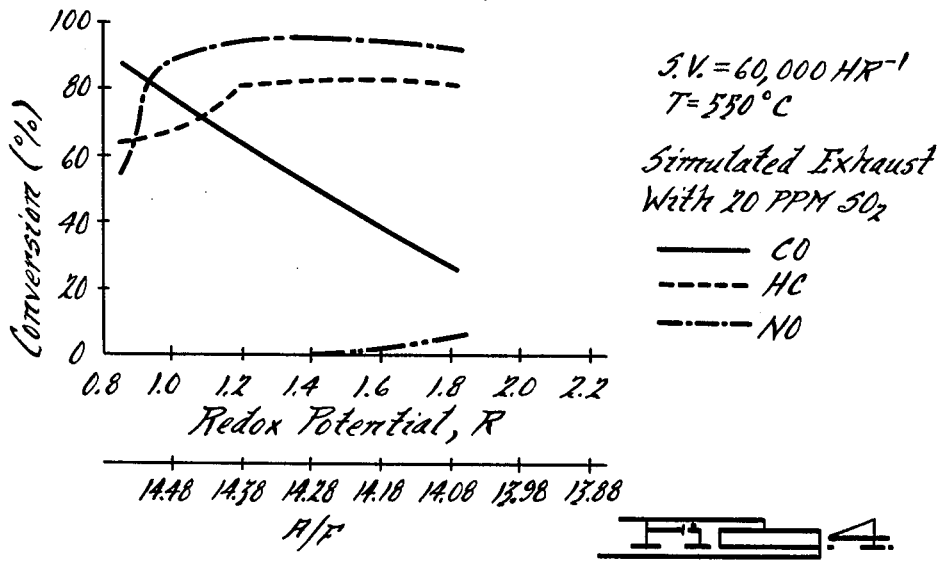
FIG. 4 is a graph which shows the effect of treatment of the same simulated exhaust gases by a catalyst system containing 0.2% by weight of the support media palladium, and 2% by weight of the support media molybdenum.

FIG. 4 discloses the effect of using molybdenum with palladium in a situation in which the molybdenum is 2% by weight of the substrate (support media) and the palladium is 0.2%, thus keeping a 10 to 1 weight ratio. In this case, an extremely small amount of ammonia is produced as a percentage of converted oxides of nitrogen in the range of redox potential from 1.4 to about 1.9. If no molybdenum had been present, other experiments not graphically depicted in the associated drawings have shown us that the amount of oxides of nitrogen converted by the palladium catalyst to ammonia is similar to that graphically depicted in FIG. 5, in which conversion efficiencies on a pure platinum catalyst are depicted. Platinum and palladium act similarly in the conversions of oxides of nitrogen, and once the redox potential goes beyond 1.2 or so, almost all oxides of nitrogen converted wind up as ammonia. In the case illustrated in FIG. 1, rhodium was also employed as an element of the catalyst system and this element is the one which converts the oxides of nitrogen selectively to nitrogen gas.

In the platinum/rhodium catalyst system, the rhodium is the principal element for converting oxides of nitrogen to other components at redox potentials above 1.2. This element is more effective in such a conversion than platinum by itself, but as FIGS. 1 and 2 indicate, the non-molybdenum containing catalyst still does produce a significant amount of ammonia as a result of the conversion process. When molybdenum is added to the platinum/rhodium catalyst system, the amount of ammonia produced is substantially curtailed.

FIGS. 5 and 6 illustrate a conversion efficiency of a platinum alone catalyst, as against a platinum/molybdenum catalyst. In both cases, the temperature of operation is 550° C. with a simulated exhaust containing 20 ppm sulfur dioxide. In the graphical presentation of FIG. 5, the catalyst is 0.176% by weight platinum on a suitable support media. In the case of FIG. 6, the catalyst is one which has 0.25% by weight platinum, with 2% by weight molybdenum on the support media.

In FIG. 5, it is seen that shortly after a redox potential of 1.3 is reached, substantially all of the oxides of nitrogen converted by the platinum alone system are converted to ammonia. In the case of almost identical catalysts containing 2% molybdenum, as shown in FIG. 6, the efficiency of converting oxides of nitrogen is increased, probably because there is a greater amount of platinum present. But, the amazing thing to note is that the oxides of nitrogen are generally not being converted to ammonia. The amount of ammonia produced is almost minuscule, compared to the amount of ammonia which was produced by the platinum catalyst not having any molybdenum present. In this situation, the molybdenum is present below its preferred 10 to 1 ratio, but, as can be seen, it is efficient and effective in the conversion operation.

Thus, with respect to the teachings of this invention, both platinum and/or palladium catalysts may be made more efficient under reducing conditions, and more selective, in that they produce less ammonia by having a concentration of molybdenum present on the catalyst support media. The catalyst support media may be the monolith or pelletized forms as we presently know them, or may be any suitable alternative, such as a metallic substrate, which are also known to the skilled artisan. Similarly, the substrates may be made out of the many different materials which have been known or are known to those skilled artisans, in particular, those ceramic materials which produce a high surface area to volume ratio.

In carrying out the method of this invention, it is required to have generally in excess of 7 times by weight the amount of molybdenum, as compared to the platinum and/or palladium metal present on the support media. Peferably, one desires to have in the range of 10 to 1 on a weight ratio basis of molybdenum to the platinum and/or palladium catalyst metal employed.

When using molybdenum, care must be taken under oxidizing conditions because molybdenum oxide $MoO_3$ is volatile at higher temperatures, particularly temperatures in excess of 500° C. It is desirable to minimize the loss of oxides of molybdenum while maintaining an optimum degree of catalytic activity and selectivity.

When a catalyst system has an alumina wash coat present, the wash coat assists in the formation of aluminum molybdate which stabilizes the molybdenum oxide to a limited extent under oxidizing conditions.

Molybdenum containing compounds may be stabilized by incorporating alkaline-earth metal oxides, rare-earth metal oxides, or certain base-metal oxides on the support media. The stabilizing element can be present in an amount about equal to the amount of molybdenum that is present. We found that out of these compounds, the most desirable stabilizing elements are lanthanum, barium, strontium, magnesium, nickel and cobalt. Stabilized molybdenum catalysts can be prepared by several techniques. For example, sequential deposition of the various materials, or a pre-synthesization thereof, and then placement of materials on the support media may be used.

The sequential technique consists of sequentially impregnating the support media with an aqueous solution of molybdenum and an aqueous solution of the appropriate stabilizing metal nitrate. The catalyst is then calcined at 650° C. for four hours with reaction taking place in-situ.

The pre-synthesized technique consists of dipping a support media in a suspension of pre-synthesized stabilized molybdenum compound and fumed alumina (used as a binding agent) followed by calcination at 650° C. for four hours in air. After either preparation, the support media is then impregnated with the platinum, palladium, combination of the two, or the combination with other catalysts, to obtain the final formulation.

This specification has taught a method for increasing the selectivity of a catalyst and a catalyst with increased selectivity. By increased selectivity, it is meant that the system can convert oxides of nitrogen to other compounds without the production of massive amounts of ammonia.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method for increasing the selectivity of a catalyst in transforming oxides of nitrogen to nitrogen rather than ammonia in which a catalyst system based upon (a) platinum, or (b) palladium, or (c) combinations of platinum and palladium, or (d) combinations of (a), (b), or (c) with other metal catalysts which are selective in transforming oxides of nitrogen to nitrogen rather than ammonia, is deposited on a support media as discreet particles in a finely divided state, which method comprises the step of:

providing on the support media molybdenum in a finely divided state, said molybdenum being present in an amount from at least one-half percent to about 20 percent by weight of the support media, but, in any event, said molybdenum being present by weight in an amount at least about seven times the weight of said platinum and/or palladium present.

2. The method of claim 1 wherein: the molybdenum is provided on the support media by a process which includes a step of depositing the molybdenum from a solution containing a molybdenum compound.

3. The method of either claims 1 or 2 wherein: said molybdenum is present by weight in an amount at least about 10 times the weight of said platinum and/or palladium present.

4. The method of claims 1, 2 or 3 wherein: a material for stabilizing molybdenum against volatilization under oxidizing conditions is also present on the support media.

5. A catalyst system of increased selectivity (less ammonia produced when oxides of nitrogen are treated) which comprises:

a support media for finely divided materials;

a finely divided catalyst system including platinum and/or palladium on said support media in an amount from about 0.01% by weight to 2.0% by weight of said support media; and finely divided molybdenum on said support media in an amount from at least ½% by weight of the weight of the support media, but, in no event, less than about 7 times by weight of said finely divided platinum and/or palladium on said support media.

6. The catalyst system of claim 5 wherein: said molybdenum is present in an amount at least about 10 times the weight of said platinum and/or palladium present on said support media.

7. The catalyst system of claims 5 or 6 wherein: a material for stabilizing molybdenum against volatilization under oxidizing conditions is also present on said support media.

* * * * *